W. F. FRASER.
MECHANICAL MOVEMENT.
APPLICATION FILED DEC. 14, 1917.

1,283,142.

Patented Oct. 29, 1918.
3 SHEETS—SHEET 1.

Inventor:
Warren F. Fraser
by his attorney
Charles N. Goodwin

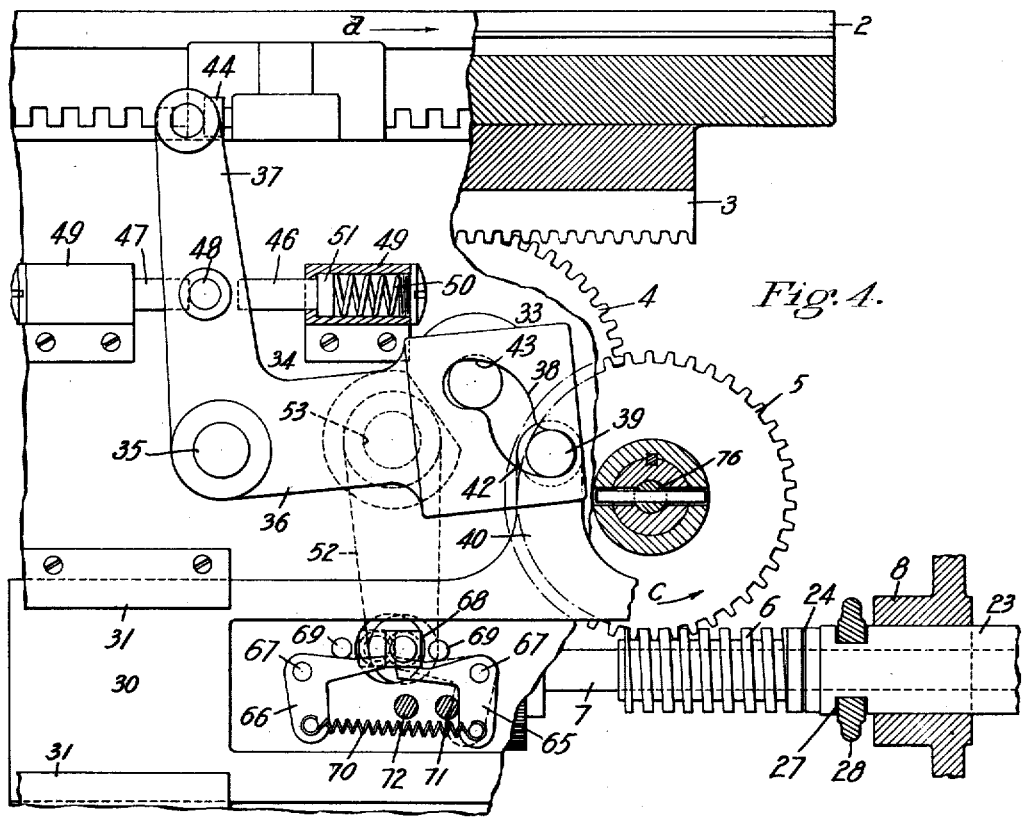

UNITED STATES PATENT OFFICE.

WARREN F. FRASER, OF WESTBORO, MASSACHUSETTS.

MECHANICAL MOVEMENT.

1,283,142.     Specification of Letters Patent.     Patented Oct. 29, 1918.

Application filed December 14, 1917. Serial No. 207,042.

*To all whom it may concern:*

Be it known that I, WARREN F. FRASER, a citizen of the United States, residing at Westboro, in the county of Worcester and State of Massachusetts, have invented new and useful Improvements in Mechanical Movements, of which the following is a specification.

This invention relates to improvements in mechanical movements and more particularly to mechanical movements adapted for use in operating reciprocatory work tables or carriages for grinders and like machines.

The object of the invention is to provide simple and positive means for operating the reciprocatory member in opposite directions and for quietly and automatically reversing the direction of movement thereof when the machine is being operated at a high rate of speed.

Still another object of the invention involves the use of instrumentalities for neutralizing the action of the driving member upon the driven member immediately prior to the shifting of the clutch and immediately following the shifting of said clutch, so as to produce a gradual reduction in the speed of the driven member and a gradual increase in the speed of said member without necessitating any reduction in the speed of the initial driving instrumentalities, thus permitting the driving member to be operated at a much greater speed than is permissible with other types of grinders.

The invention consists in the combination and arrangement of parts, whereby the above objects and certain other objects hereinafter appearing may be attained, as set forth in the following specification and particularly pointed out in the claims.

Referring to the drawings:

Fig. 4 is a detail sectional view taken on the line 4—4 of Fig. 3, certain parts in said view being shown in elevation.

Fig. 5 is a section taken on the line 5—5 of Fig. 1.

Like numerals refer to like parts throughout the several views of the drawings.

Figure 1:
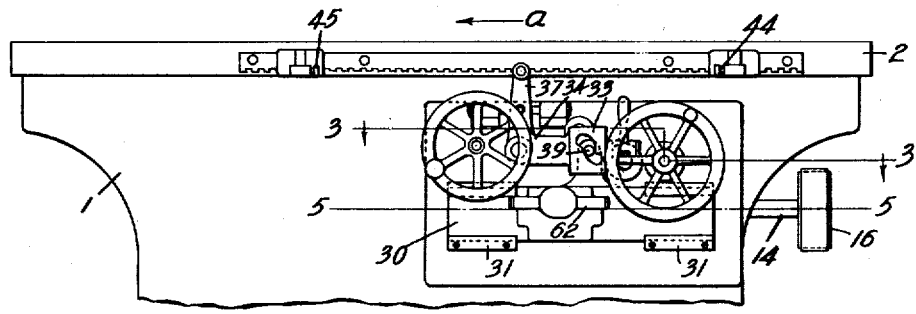
Figure 1 is a side elevation of a portion of a grinder with driving means embodying this invention shown in connection therewith.

In the drawings, 1 represents the frame of a grinder. 2 is a reciprocatory work table superimposed on said frame and adapted to be operated by suitable gearing, including a rack 3, secured underneath the under part of said table. A gear 4 is adapted to mesh with said rack and this gear is operatively connected with a gear 5, preferably a worm gear, by means of an intermediate gear 4', which is adapted to be rotated by said worm gear. The worm gear 5 is driven by a worm 6 engaging the teeth on the periphery of said worm.

Figure 3:
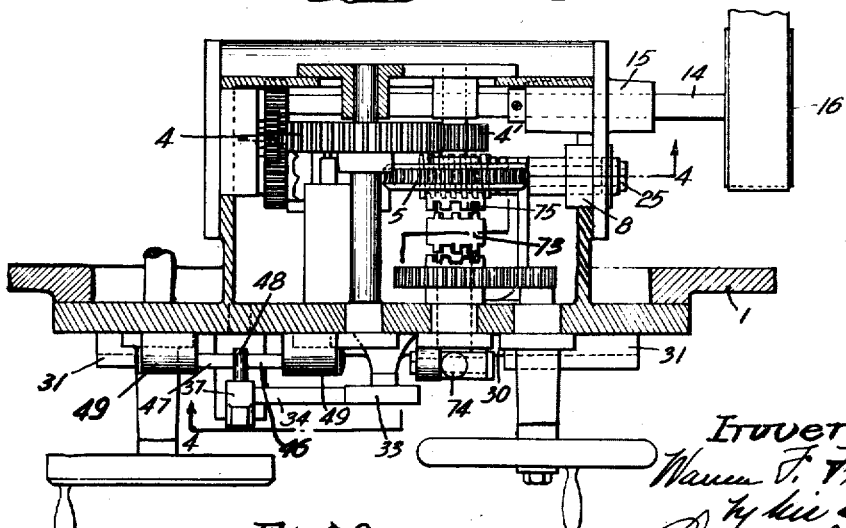
Fig. 3 is a section taken on the line 3—3 of Fig. 1, with certain parts shown in elevation.

The worm 6 is secured to a shaft 7 journaled in suitable bearings in the frame of the grinder, one of which is shown at 8. Slidably mounted upon the shaft 7 but rotatable with said shaft is a clutch member 9 having teeth 10 and 11 disposed at opposite ends respectively of said clutch member. Loosely mounted upon said shaft 7 adjacent to the end of the clutch member having the teeth 10 thereon is a gear 12 which is arranged to mesh with a gear 13 fast upon a shaft 14 which, in the present case, is the driving shaft of the grinder, said driving shaft being journaled to rotate in suitable bearings, one of which is shown at 15, Fig. 3, and on this shaft is a pulley 16 from which the shaft receives its motion.

The gear 12 has teeth 17 adapted to interlock with the teeth 10 of the clutch member 9 and impart a rotary motion, through said clutch member, to the shaft upon which it is mounted when said teeth are in engagement with each other, thus rotating the worm 6 in one direction. Loosely mounted upon the shaft 7, adjacent to the end of the clutch member 9 bearing the teeth 11, is a gear 18 provided with teeth 19 adapted to engage the teeth 11 on said clutch member when the teeth 10 of said clutch member are disengaged from the teeth 17 of the gear 12 and these teeth 19 are arranged to operate said clutch member in a reverse direction to that imparted by the teeth 17.

The gear 18 meshes with an intermediate gear 20 which, in turn, meshes with a gear 21 fast to the driving shaft 14 and the last mentioned train of gears is adapted to rotate the worm shaft 7, through the clutch member 9, in an opposite direction to that imparted by the train of gears 12 and 13. A key 22 prevents the rotation of the clutch member 9 relatively to said shaft 7 and permits said clutch member to be moved longitudinally of said shaft from the teeth 17 of the gear 12 to the teeth 19 of the gear 18.

During the rotation of the worm 6 in engagement with said gear 5, the thrust of said worm is borne by suitable end thrust bearings, preferably consisting of a sleeve 23, which is mounted upon said shaft and slidable in the bearing 8. Interposed between one end of the sleeve 23 and the worm 6 is a ball washer 24 and interposed between the opposite end of said sleeve 23 and the nut 25 secured to said shaft 7 is a second ball washer 26. The sleeve 23 is slotted at 27 and receives a yoke 28 on the arm 29 secured to a slide 30 slidably mounted in suitable guides 31 on the frame 1, said slide being preferably arranged at the front of said frame with the arm 29 extending through a slot 32 cut through said frame.

The slide 30 carrying the arm 29 is arranged to reciprocate in its guides 31 in a direction substantially parallel with the axis of the shaft 7 and for the purpose of neutralizing, at certain times in the operation of the machine, the effect of the worm 6 upon said gear 5. The period when said neutralizing effect takes place is governed by the movement of the table 2 and is accomplished preferably by means of a cam member 33 which, in its preferred form, embraces a lever 34 pivoted at 35 to the frame 1. This lever has two arms 36 and 37. The arm 36 carries the cam member 33 embodying a cam slot 38, adapted to receive a follower 39 carried by an arm 40 upon the slide 30.

The normal position of the arm 36 on said lever 34 is substantially parallel with the axis of the shaft 7 and when in this position the follower 39 is adapted to rest in the middle portion 41 of the cam slot 38, which portion is substantially straight and extends approximately at right angles to the axis of said shaft 7. The slot has two sections 42 and 43 extending in opposite directions from the straight portion 41 thereof, the section 42 extending away from the pivot 35 of said lever in a gradual curve, while the section 43 gradually curves inwardly from said straight portion toward said pivot 35.

When said lever 34 is in its central position with the follower 39 in the straight or rest portion of the cam slot, the slide 30 will be prevented from moving longitudinally of the axis of the shaft 7 and consequently the entire movement of the worm 6 will be transmitted to the worm gear 5. The other arm 37 of the lever 34 is constructed and arranged to engage adjustable abutments 44 and 45 carried by the table 2 which may be adjusted to engage said lever at predetermined periods in the operation of the machine and rock said lever in one direction or the other and during said rocking movement the follower 39 will enter either the section 42 or the section 43 of said cam and be moved thereby to transmit a limited movement to the slide 30 longitudinally of the axis of the shaft 7.

The arm 37 of said lever 34 is adapted to be yieldingly maintained in its central position when not engaged by one or the other of said abutments, preferably by means of pins 46 and 47 arranged upon opposite sides of said lever and adapted to engage a projection 48 on said arm. The pins 46 and 47 are each slidably mounted in brackets 49 and are yieldingly held in protruding relation to said brackets by springs 50 arranged within said brackets and adapted to engage the shouldered portions 51 of said pins.

The springs 50 are adjusted so as to prevent any pressure being exerted by said pins upon the projection 48 of said lever when said lever is in its central position, but these springs will act as cushions for said lever when said lever is moved to one side or the other. The slide 30 is also arranged to accomplish the shifting of the clutch member 9 and the means whereby this movement may be transmitted to said clutch member preferably embodies a clutch shifting lever 52 pivoted at 53 to the frame of the machine. This lever has two arms 54 and 55, which are arranged substantially in alinement with each other, consequently, the arm 54 of said lever, as indicated partly in full lines and partly in dotted lines, Fig. 4, would entirely obscure the arm 55 lying directly behind the same and at the distance therefrom, as shown in the sectional plan view, Fig. 5. These arms 54 and 55 are preferably formed integral with a hub 53' which is bored to receive the shaft constituting the pivot 53. The arm 54 is a forked arm which engages a ring 56 arranged in an annular groove 57 formed in the clutch member 9. The other arm 55 of said lever has a stud 58 attached thereto, which projects through an opening 59 in the front wall of the frame 1 and between a pair of oppositely disposed spring plungers 60 and 61 slidably mounted in suitable brackets 62 attached to the slide 30.

A spring 63 is interposed between the rear end of each of the plungers 60 and 61 and the portion of the brackets 62 so as to exert a yielding pressure upon said plungers. The slide 30 has a recess 64 extending transversely therethrough at the rear of the brackets containing the plungers 60 and 61 and within this recess are pawls 65 and 66 pivoted at 67 to the front wall of the frame 1. The ends of the pawls 65 and 66 are adapted to engage a portion 68 of the stud 58, said portion 68 of said stud being square for this purpose.

Stop pins 69 are provided for limiting the upward movements of said pawls and said pawls are adapted to be normally held in engagement with said stop pins, preferably by means of a spring 70 interposed between said pawls and exerting equal pressure upon each. The ends of the pawls 65 and 66 are positioned with relation to each other so that when one is holding said stud 58 in such a position that the clutch member 9 is in one of its operating positions, the end of the other pawl will be deflected by said stud in readiness to engage said stud when the same is moved to the other clutch engaging position.

To actuate the pawls 65 and 66 at the proper time to release the clutch operating lever, pins 71 and 72 are carried by the slide 30 and adapted to respectively engage the pawls 65 and 66 at the proper time in the operation of the slide.

The general operation of the machine hereinbefore specifically described is as follows:

Assuming that the abutments 44 and 45 are adjusted properly motion is imparted to the driving shaft 14, thence through one or the other of the train of gears to the worm shaft 7. The worm 6 transmits motion to the worm gear 5 and this motion may, in turn, be transmitted through a sliding clutch 73 which may be shifted by a hand lever 74 into engagement with the teeth 75 on said worm to a shaft 76, upon which said gear 5 is loosely pivotally mounted. The shaft 76 rotates the gear 4' and through the gear 4 imparts motion to the rack 3 and incidentally the table 2.

The direction in which said table will be moved at this time depends upon the position of the clutch member 9 and we will assume that said clutch member 9 is in engagement with the gear 18, thus said gear will impart a movement to the table 2 in the direction of the arrow $a$, Fig. 1. The movement of said table in the direction indicated continues until the abutment 44 engages the lever 34 and rocks said lever from the position shown in Fig. 1, which is the central position, into the position indicated in Fig. 4.

This movement of said lever causes the section 42 of the cam 38 to act upon the follower 39 and force said follower to the right, as shown, moving with said follower the slide 30, and incidentally the sleeve 23 will be moved in the same direction and cause the worm 6 to be moved longitudinally of the axis of the shaft 7, thus neutralizing the effect of said worm upon the gear 5, thereby reducing the speed of the table 2 and finally stopping the movement of said table altogether, although said table is not stopped until the lever 34 has been rocked so as to bring the follower 39 to the end of the section 42 of the cam slot.

Figure 2:
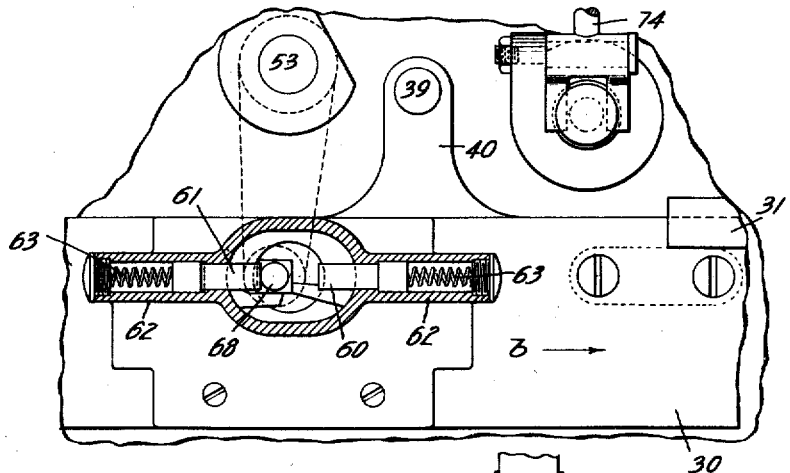
Fig. 2 is a detail side view of portions of the clutch and worm shifting slide with the casing containing the spring actuated contact members for said clutch shifting means shown in section.

Before the abutment 44 has engaged the lever 34 to rock the same about its pivot, the stud 58 will be occupying the position shown in Fig. 2, at which time, as hereinbefore stated, the clutch member 9 is in its left hand position, with reference to Fig. 5, and engaging the gear 18. The stud 58 will be held at this time in the position shown in Fig. 2, by the pawl 65 which occupies the position illustrated in dotted lines, Fig. 4. As the slide 30 is moved in the direction of the arrow $b$ by the section 42 of said cam 38, the bracket 62 will be moved therewith and the spring 63 at the rear of the plunger 61 will be compressed and thereby exert considerable pressure against the stud 58 which, at this time, is prevented from moving by the pawl 65.

As said slide approaches the extreme end of its movement, in the direction of the arrow $b$, the pin 71 carried thereby will engage the pawl 65 and trip the same, thereby releasing the stud 58, permitting the spring to act through the plunger 61 and force said stud 58 to the position shown in full lines, Fig. 4, and simultaneously with the movement of said stud 58 the clutch member 9 will be disengaged from the gear 18 and moved into engagement with the gear 12.

At the time this change takes place, the effect of the worm 6 upon the gear 5 will have been neutralized so that said worm 6 and the train of gears connected therewith will come to rest and immediately upon the shifting of the clutch member the worm 6 will be rotated in an opposite direction. The first part of the movement of said worm in the last mentioned direction will not move the gear 5 for the reason that the end thrust bearings will be permitted to move with the slide 30 until the follower 39 moves from the end 42 of the slot 38, as shown in Fig. 4, to the straight portion of said slot, as shown in Fig. 1.

A further movement of said slide 30 will be prevented when said follower engages the side of said straight portion directly in a plane parallel with the axis of said worm and containing the axis of said cam lever. When this movement of said follower is taking place, the effect of said worm 6 upon the gear 5, owing to the peculiar shape of the slot section 42, will be to slowly start the worm gear into operation in the direction of the arrow c, Fig. 4, and gradually increase the speed thereof, thus reversing the direction of movement of the table 2, which movement will continue until the abutment 45 strikes the arm 37 and rocks said arm in the opposite direction.

As soon as the table 2 starts to operate in the direction of the arrow d, which it does when the gear 5 is rotated in the direction of said arrow c, the abutment 44 will be withdrawn from the lever 34 and permit the springs 50, acting through the pins 46 and 47, to coöperate with the worm 6, and cam section 42 to centralize the cam lever so as to retain said follower in said straight portion.

Furthermore, the movement of the slide 30 in the direction which results in the return of the follower 39 from the section 42 of the slot 38 to the straight portion thereof, causes the plunger 60 to engage the stud 58 and the springs 63 engaging said plunger will be compressed in readiness to shift the clutch when the stud 58 is again released, by the tripping of the pawl 66 through the instrumentalities of the pin 72 on said slide 30. The reversing operation of the driving mechanism will be repeated just as long as the clutch 73 engages the worm gear 5 and power is supplied to the driving shaft of the machine.

Figure 6:
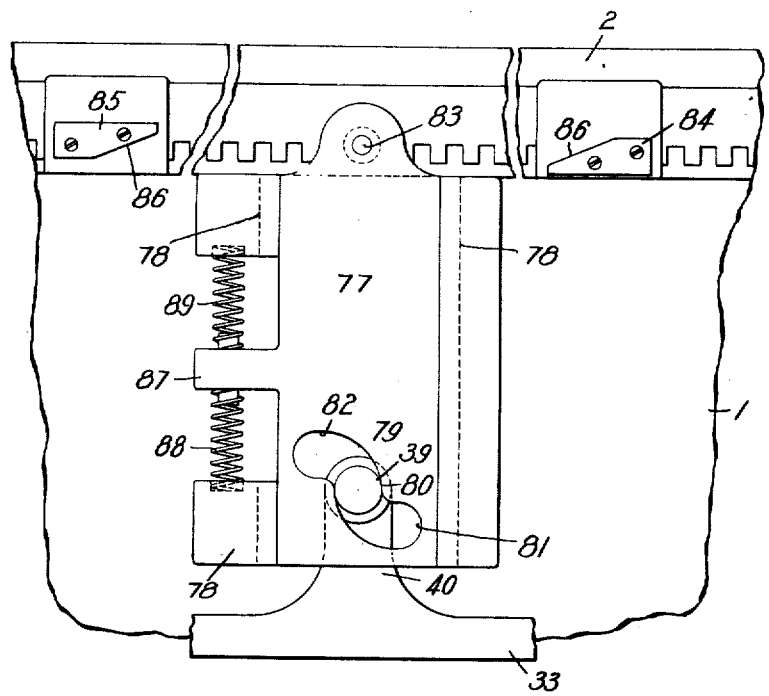
Fig. 6 is a detail view of a modified form of the clutch and worm shifting means.

In Fig. 6 of the drawings I have illustrated a modified form of cam. In this form 77 is a slide arranged to reciprocate vertically in guides 78 attached to the frame 1 of the machine. This slide has a cam slot 79 consisting of a straight portion 80 and sections 81 and 82 curving in opposite directions with respect to a vertical plane passing through the center of the straight portion 80 of said slot at right angles to the direction of movement of said slide. The follower 39 of the slide 30 works in the cam slot 79 in substantially the same manner as in the previous case.

The slide 77 has a roll 83 attached to its upper end in the path of abutments 84 and 85 which are adjustably mounted on the reciprocatory work table 2 and these abutments are beveled at 86 and in opposite directions. The bevel of the abutment 84 causes said slide 77 to be moved upwardly when it engages the cam roll 83 while the bevel 86 of the abutment 85 engages said roll 83 and causes the slide to be depressed, thus imparting a reciprocatory movement to said slide 30.

The slide 77 has a projection 87 extending laterally therefrom which is interposed between two sections of one of the guides for said slide, and between opposite faces of said projection and portions of said guide are springs 88 and 89 constructed and arranged to centralize said slide when pressure is removed therefrom and also to assist in returning said slide to its normal position.

It has been previously stated that the mechanism hereinbefore described is particularly adapted for use in operating the work table of a grinder but it will be evident that the mechanism is not limited to this particular adaptation but may be used in various other types of machines. Furthermore, the particular construction of the present embodiment of the invention is but one of the many forms which may be employed, therefore, the invention should not be considered as limited to this particular embodiment but other embodiments may be employed without departing from the spirit and scope of the invention, as defined in the appended claims.

Having thus specifically described my invention what I claim and desire by Letters Patent to secure is:

1. An apparatus of the class described having, in combination, a driving member, a driven member operating with said driving member, a slide adapted to support said driving member, and a cam lever operatively connected with said slide adapted to be operated to move said slide and the driving member supported thereby to neutralize the effect of said driving member upon said driven member.

2. An apparatus of the class described having, in combination, a gear, a worm adapted to rotate said gear, and means constructed and arranged to move said worm bodily with respect to said gear to neutralize the effect of said worm upon said gear.

3. An apparatus of the class described having, in combination, a gear, a worm adapted to rotate said gear, and means constructed and arranged to move said worm bodily longitudinally of its axis to neutralize the effect of said worm upon said gear.

4. An apparatus of the class described having, in combination, a gear, driving means for said gear rotating in engagement with the periphery thereof, a plate having a cam slot formed therein, a roll adapted to engage said slot, means operatively connecting said roll with said driving means, and means for moving said plate to neutralize the effect of said driving member upon said gear.

5. An apparatus of the class described having, in combination, a gear, a worm adapted to engage the periphery of and rotate said gear, an end thrust bearing for said worm, and means constructed and arranged to move said end thrust bearing during the operations of said worm to neutralize the effect of said worm upon said gear.

6. An apparatus of the class described having, in combination, a gear, a worm adapted to engage and rotate said gear, an end thrust bearing for said worm, and means controlled by the operation of said gear constructed and arranged to move said end thrust bearing during the operations of said worm to neutralize the effect of said worm upon said gear.

7. An apparatus of the class described having, in combination, a table, means for reciprocating said table including a gear, a worm adapted to rotate said gear, an end thrust bearing for said worm, and means operated by said table adapted to move said end thrust bearing during the operations of said worm to neutralize the effect of said worm upon said gear.

8. An apparatus of the class described having, in combination, a table, means for reciprocating said table including a gear, a worm adapted to rotate said gear, a clutch adapted to be operated to rotate said worm in opposite directions, means operated by said table adapted to move said worm longitudinally of its axis to neutralize the effect of said worm upon said gear, and means operated by said worm moving means during the neutralizing action thereof, adapted to shift said clutch and reverse the action of said worm.

9. An apparatus of the class described having, in combination, a table, means for reciprocating said table including a gear, a worm adapted to rotate said gear, means for reversing the action of said worm, a movable frame, an end thrust bearing for said worm carried by said frame, and means operated by said table adapted to move said frame and said thrust bearing in a direction reverse to that of said gear, whereby the effect of said worm on said gear will be neutralized.

10. An apparatus of the class described having, in combination, a reciprocating member, means for reciprocating said member including a gear, a worm adapted to rotate said gear, a pivoted cam, a slide adapted to be reciprocated by said cam, means carried by said reciprocating member adapted to rock said cam on its pivot, means carried by said slide adapted to move said worm longitudinally of its axis to neutralize the effect of said worm upon said gear, means for rotating said worm in opposite directions, a clutch adapted to be shifted from one of said worm rotating means to the other to reverse the action of said worm, and means carried by said slide adapted to shift said clutch.

11. An apparatus of the class described having, in combination, a reciprocating member, a gear operatively connected with said reciprocating member, a worm adapted to rotate said gear, forward and reverse driving means for said worm, a clutch adapted to be moved to connect said worm either with said forward driving means or with said reverse driving means, and means operated by said reciprocating member adapted to shift said clutch from one of said driving means to the other and for reducing the speed of said gear immediately prior to the shifting of said clutch and for accelerating the speed of said gear immediately following the shifting of said clutch.

12. An apparatus of the class described having, in combination, a gear, a worm adapted to rotate said gear, forward and reverse driving means for said worm, means to automatically shift from one of said driving means to the other, and means adapted to gradually reduce the speed of said gear prior to the shift from one of said driving means to the other and to gradually accelerate the speed of said gear immediately following said shift.

13. An apparatus of the class described having, in combination, a gear, a worm adapted to rotate said gear, forward and reverse driving means for said worm, a clutch adapted to operatively connect said worm with one or the other of said driving means, means for automatically shifting said clutch, and means for gradually neutralizing the effect of said worm upon said gear and thereby reduce the speed of said gear immediately prior to the shifting of said clutch.

14. An apparatus of the class described having, in combination, a gear, a worm adapted to rotate said gear, forward and reverse driving means for said worm, a clutch adapted to operatively connect said worm with one or the other of said driving means, means for automatically shifting said clutch, and means for gradually neutralizing the effect of said worm upon said gear and thereby reduce the speed of said gear immediately prior to the shifting of said clutch, said means being also adapted to gradually accelerate the speed of said gear immediately following the shifting of said clutch.

15. An apparatus of the class described having, in combination, a gear, a worm adapted to rotate said gear, forward and reverse driving means for said worm, a slide, means operated by said slide adapted to shift from one of said driving means to the other, and a movable cam member adapted to be automatically operated to move said slide in opposite directions.

16. An apparatus of the class described having, in combination, a table, means for reciprocating said table, including a gear, a worm adapted to rotate said gear, forward and reverse driving means for said worm, a clutch adapted to operatively connect one or the other of said driving means with said worm, a movable cam member adapted to be operated in opposite directions by said table, and means operatively connecting said cam member with said worm and said clutch, adapted to neutralize the effect of said worm upon said gear and shift said clutch.

17. An apparatus of the class described having, in combination, a table, means for reciprocating said table, including a gear, a worm adapted to rotate said gear, forward and reverse driving means for said worm, a clutch adapted to operatively connect one or the other of said driving means with said worm, a movable cam member adapted to be operated in opposite directions by said table, means for yieldingly maintaining said cam member in its central position, and means operatively connecting said cam member with said worm and said clutch, adapted to neutralize the effect of said worm upon said gear and shift said clutch.

18. An apparatus of the class described having, in combination, a table, means for reciprocating said table, including a gear, a worm adapted to rotate said gear, forward and reverse driving means for said worm, a clutch adapted to operatively connect one or the other of said driving means with said worm, a movable cam member adapted to be operated in opposite directions by said table, a pair of oppositely disposed spring actuated contact members adapted to centralize said cam member, and means operatively connecting said cam member with said worm and said clutch, adapted to neutralize the effect of said worm upon said gear and shift said clutch.

19. An apparatus of the class described having, in combination, a gear, a worm adapted to rotate said gear, forward and reverse driving means for said worm, a clutch adapted to operatively connect said worn with one or the other of said driving means, a slide, end thrust bearings for said worm supported by said slide, means adapted to automatically move said slide and said worm in opposite directions, and yieldable means operatively connecting said slide with said clutch, adapted to shift said clutch in opposite directions.

20. An apparatus of the class described having, in combination, a gear, a worm adapted to rotate said gear, forward and reverse driving means for said worm, a clutch adapted to operatively connect said worm with one or the other of said driving means, a slide, end thrust bearings for said worm supported by said slide, means adapted to automatically move said slide and said worm in opposite directions, clutch engaging means, and a pair of oppositely disposed spring actuated members carried by said slide, adapted to move said clutch engaging members in opposite directions to shift said clutch.

21. An apparatus of the class described having, in combination, a gear, a worm adapted to rotate said gear, forward and reverse driving means for said worm, a clutch adapted to operatively connect said worm with one or the other of said driving means, a slide, end thrust bearings for said worm supported by said slide, means adapted to automatically move said slide and said worm in opposite directions, clutch engaging means, a pair of oppositely disposed spring actuated members carried by said slide, adapted to move said clutch engaging members in opposite directions to shift said clutch, means for locking said clutch in its operating positions, and means operated by said slide adapted to release said clutch.

22. An apparatus of the class described having, in combination, a gear, a worm adapted to operate said gear, a slide, a bearing supported by said slide, adapted to receive the end thrust upon said worm, forward and reverse driving means for said worm, a clutch adapted to operatively connect said worm with one or the other of said driving means, a clutch lever, oppositely disposed spring actuated members carried by said slide, adapted to engage said clutch lever, means adapted to lock said clutch lever in its operating positions; means to automatically move said slide in opposite directions to apply tension to one or the other of said spring actuated members, and means actuated by said slide adapted to trip said clutch lever locking means and permit said spring actuated plunger to move said clutch lever to shift said clutch.

In testimony whereof I have hereunto set my hand in presence of two subscribing witnesses.

WARREN F. FRASER.

Witnesses:
SYDNEY E. TAFT,
HATTIE E. STRATTON.